(12) United States Patent
Nie et al.

(10) Patent No.: US 12,124,148 B2
(45) Date of Patent: Oct. 22, 2024

(54) ELECTRONIC PAPER DISPLAY SCREEN AND MANUFACTURING METHOD THEREFOR, AND DISPLAY DEVICE

(71) Applicants: Beijing BOE Optoelectronics Technology Co., Ltd., Beijing (CN); BOE Technology Group Co., Ltd., Beijing (CN)

(72) Inventors: Lingfang Nie, Beijing (CN); Yong Zhang, Beijing (CN); Jian Wang, Beijing (CN); Jinshuai Duan, Beijing (CN); Zhichao Yang, Beijing (CN); Li Tian, Beijing (CN); Jian Lin, Beijing (CN); Xianglei Qin, Beijing (CN); Limin Zhang, Beijing (CN); Honggui Jin, Beijing (CN); Zepeng Sun, Beijing (CN); Yashuai An, Beijing (CN); Liangzhen Tang, Beijing (CN); Zhilong Duan, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 122 days.

(21) Appl. No.: 17/772,149

(22) PCT Filed: Jun. 11, 2021

(86) PCT No.: PCT/CN2021/099763
§ 371 (c)(1),
(2) Date: Apr. 27, 2022

(87) PCT Pub. No.: WO2022/022112
PCT Pub. Date: Feb. 3, 2022

(65) Prior Publication Data
US 2022/0373851 A1    Nov. 24, 2022

(30) Foreign Application Priority Data

Jul. 29, 2020 (CN) .......................... 202010744495.4

(51) Int. Cl.
| | | |
|---|---|---|
| *G02F 1/167* | (2019.01) | |
| *G02F 1/1362* | (2006.01) | |
| *G02F 1/137* | (2006.01) | |
| *G02F 1/139* | (2006.01) | |

(52) U.S. Cl.
CPC ........ *G02F 1/167* (2013.01); *G02F 1/136209* (2013.01); *G02F 1/136286* (2013.01); *G02F 1/13718* (2013.01); *G02F 1/1391* (2013.01)

(58) Field of Classification Search
CPC .......... G02F 1/13718; G02F 1/136209; G02F 1/1677; G02F 1/1391; G02F 1/136286;
(Continued)

(56) References Cited

U.S. PATENT DOCUMENTS

| | | | | |
|---|---|---|---|---|
| 6,061,107 A | * | 5/2000 | Yang .................... | G02F 1/13718 349/35 |
| 2006/0055650 A1 | * | 3/2006 | Kwok .................. | G09G 3/3629 345/87 |

(Continued)

FOREIGN PATENT DOCUMENTS

| | | |
|---|---|---|
| CN | 200983018 Y | 11/2007 |
| CN | 102033365 A | 4/2011 |

(Continued)

OTHER PUBLICATIONS

International Search Report for PCT/CN2021/099763 Mailed Sep. 8, 2021.

(Continued)

*Primary Examiner* — Hoan C Nguyen
(74) *Attorney, Agent, or Firm* — Ling Wu; Stephen Yang; Ling and Yang Intellectual Property

(57) ABSTRACT

An electronic paper display screen and a manufacturing method therefor, and a display device. The electronic paper
(Continued)

display screen includes a first electronic paper screen and a second liquid crystal display layer which are stacked; the first electronic paper screen is an electrophoretic electronic paper screen, the second liquid crystal display layer is a cholesteric liquid crystal display screen, and the second liquid crystal display layer includes a first substrate, a second substrate and a control drive circuit; the first substrate is provided with multiple first electrodes arranged in a first direction, and the second substrate is provided with multiple second electrodes arranged in a second direction; and at least one of the first substrate and the second substrate is further provided with multiple metal wires, the metal wires are respectively connected to the control drive circuit and the electrodes of the substrate to which the metal wires belong.

10 Claims, 12 Drawing Sheets

(58) Field of Classification Search
CPC .. G02F 1/167; G02F 2201/44; G02F 1/13439; G02F 1/134309; G02F 1/1368; G02F 1/13394
See application file for complete search history.

(56) References Cited

U.S. PATENT DOCUMENTS

| | | | |
|---|---|---|---|
| 2008/0252821 A1 | 10/2008 | Liao et al. | |
| 2008/0304134 A1* | 12/2008 | Ban | G02F 1/167 359/296 |
| 2010/0091218 A1* | 4/2010 | Rho | G02F 1/13718 349/68 |
| 2011/0085121 A1 | 4/2011 | Jeon et al. | |
| 2011/0116018 A1* | 5/2011 | Kato | G02F 1/13473 349/78 |
| 2012/0032175 A1* | 2/2012 | Wang | H10K 59/50 257/59 |
| 2013/0286334 A1* | 10/2013 | Satoh | G02B 26/005 359/290 |
| 2014/0232972 A1* | 8/2014 | Kim | G02F 1/133502 349/113 |

FOREIGN PATENT DOCUMENTS

| | | | | |
|---|---|---|---|---|
| CN | 102073164 A | | | 5/2011 |
| CN | 102162952 A | | | 8/2011 |
| CN | 202120015 U | | | 1/2012 |
| CN | 102879962 A | * | | 1/2013 |
| CN | 108037625 A | | | 5/2018 |
| CN | 108459440 A | | | 8/2018 |
| CN | 111025806 A | | | 4/2020 |
| JP | 2000-250059 A | | | 9/2000 |
| KR | 20120122651 A | * | | 11/2012 |
| KR | 101728353 B1 | * | | 5/2017 |
| TW | 200841080 A | | | 10/2008 |

OTHER PUBLICATIONS

Office Action dated Aug. 3, 2022 for Chinese Patent Application No. 202010744495.4 and English Translation.
Yaxiang Dai, "Design and Operation of TFT-LCD Panels", p. 177.

* cited by examiner ns and a second passivation layer provided on the second metal layer, and a second electrode layer provided on the second passivation layer; the first metal layer includes multiple first metal wires, the second metal layer includes multiple second metal wires, the first electrode layer includes the first electrodes, the second electrode layer includes the second electrodes, the first metal wires are connected to the first electrodes through an opening in the first passivation layer, and the second metal wires are connected to the second electrodes through an opening in the second passivation layer.
ELECTRONIC PAPER DISPLAY SCREEN AND MANUFACTURING METHOD THEREFOR, AND DISPLAY DEVICE

CROSS-REFERENCE TO RELATED APPLICATIONS

The present disclosure is a U.S. National Phase Entry of International Application PCT/CN2021/099763 having an international filing date of Jun. 11, 2021, which claims priority of Chinese Patent Application No. 2020107444954, filed to the CNIPA on Jul. 29, 2020 and entitled "Electronic Paper Display Screen and Manufacturing Method Therefor, and Display Device", the contents disclosed in the above-mentioned applications are hereby incorporated as a part of this application.

TECHNICAL FIELD

Embodiments of the present disclosure relate to, but are not limited to, the field of display technologies, and in particular to an electronic paper display screen and a method for manufacturing the electronic paper display screen, and a display device.

BACKGROUND

Electronic paper is a new generation of display technology after Liquid Crystal Display (LCD), Light Emitting Diode (LED) and Organic Light Emitting Diode (OLED). It is widely used in fields such as price signs, electronic reading, product media, watches, mobile phones. The electronic paper is a perfect combination of ordinary paper and electronic display technology, and has a series of advantages such as low power consumption, wide view angle, high contrast, high resolution, lightness, thinness, portability, and no visual fatigue, which is a development direction of future display technology.

SUMMARY

The following is a summary of subject matters described in the present disclosure in detail. The summary is not intended to limit the scope of protection of claims.

An embodiment of the present disclosure provides an electronic paper display screen, including a first electronic paper screen and a second liquid crystal display layer provided on the first electronic paper screen, wherein the first electronic paper screen is an electrophoretic electronic paper screen and the second liquid crystal display layer is a cholesteric liquid crystal display screen, the second liquid crystal display layer includes a first substrate, a second substrate and a control drive circuit; the first substrate and the second substrate are oppositely provided, a surface of the first substrate facing the second substrate is provided with multiple first electrodes arranged along a first direction, and a surface of the second substrate facing the first substrate is provided with multiple second electrodes arranged along a second direction; at least one of the first substrate and the second substrate is further provided with multiple metal wires, the metal wires are respectively connected to the control drive circuit and the electrodes of the substrate to which the metal wires belong, and the metal wires are integrally overlapped with the electrodes of the substrate to which the metal wires belong, or the metal wires are connected to at least one connection point on the electrodes of the substrate to which the metal wires belong.

In some possible implementations, the first substrate includes a first base, a first metal layer provided on the first base, a first passivation layer provided on the first metal layer, and a first electrode layer provided on the first passivation layer; the second substrate includes a second base, a second metal layer provided on the second base, a second passivation layer provided on the second metal layer, and a second electrode layer provided on the second passivation layer; the first metal layer includes multiple first metal wires, the second metal layer includes multiple second metal wires, the first electrode layer includes the first electrodes, the second electrode layer includes the second electrodes, the first metal wires are connected to the first electrodes through an opening in the first passivation layer, and the second metal wires are connected to the second electrodes through an opening in the second passivation layer.

In some possible implementations, the first passivation layer is provided with at least one elongated first opening through which the first metal wires are integrally overlapped with the first electrodes, and an orthographic projection of the first metal wires on the first base includes an orthographic projection of the at least one first opening on the first base.

In some possible implementations, the first passivation layer is provided with at least one third opening, and a first metal wire is provided with at least one second protrusion, each of the at least one second protrusion is overlapped with a connection point on a first electrode through the at least one third opening.

In some possible implementations, the second passivation layer is provided with at least one second opening, and a second metal wire is provided with at least one first protrusion, each of the at least one first protrusion is overlapped with a connection point of a second electrode through the at least one second opening.

In some possible implementations, the second substrate further includes a black matrix provided between the second base and the second metal layer, and an orthographic projection of the black matrix on the second base includes an orthographic projection of the first metal wires on the second base and includes an orthographic projection of the second metal wires on the second base.

In some possible implementations, the black matrix includes first black matrices arranged along the first direction and second black matrices arranged along the second direction, and a width of a first black matrix along the first direction is greater than a width of a second black matrix along the second direction.

In some possible implementations, the first black matrix includes a first side and a second side oppositely provided along the first direction, a distance between an orthographic projection of the first side on the first base and an orthographic projection of a first metal wire adjacent to the first side on the first base is greater than or equal to a preset first distance, and an orthographic projection of the second side on the first base coincides with an orthographic projection of a boundary of a first electrode adjacent to the second side close to the second side on the first base. The second black matrix includes a third side and a fourth side oppositely provided along the second direction, an orthographic projection of the third side on the first base coincides with an orthographic projection of a boundary of a second electrode adjacent to the third side close to the third side on the first base, and an orthographic projection of the fourth side on the first base coincides with an orthographic projection of a boundary of a second electrode adjacent to the fourth side close to the fourth side on the first base.

In some possible implementations, the black matrix includes first black matrices arranged along the first direction and second black matrices arranged along the second direction, a first black matrix includes at least one first region and at least one second region, a width of a first region along the first direction is greater than a width of a second black matrix along the second direction, at least one third protrusion along the first direction is provided in the second region, and a width of a third protrusion along the second direction is greater than a width of the second black matrix along the second direction.

In some possible implementations, the electronic paper display screen further includes a frame sealing glue, a support retaining wall, first bistable cholesteric liquid crystal and second bistable cholesteric liquid crystal provided between the first substrate and the second substrate, the support retaining wall is in a curved strip shape, one side of the support retaining wall and the frame sealing glue form a first accommodating space, the other side of the support retaining wall and the frame sealing glue form a second accommodating space, two adjacent first electrodes are respectively located in the first accommodating space and the second accommodating space, the first accommodating space is filled with the first bistable cholesteric liquid crystal, and the second accommodating space is filled with the second bistable cholesteric liquid crystal.

In some possible implementations, the electronic paper display screen further includes a frame sealing glue, a support retaining wall, and third bistable cholesteric liquid crystal provided between the first substrate and the second substrate, the frame sealing glue between the first substrate and the second substrate forms a third accommodating space, the third accommodating space is filled with the third bistable cholesteric liquid crystal, and an orthographic projection of the metal wires on the first substrate includes an orthographic projection of the support retaining wall on the first substrate.

In some possible implementations, the electronic paper display screen further includes a third liquid crystal display layer provided on the second liquid crystal display layer, the third liquid crystal display layer includes a third substrate, a fourth substrate, and a frame sealing glue, a support retaining wall and fourth bistable cholesteric liquid crystal provided between the third substrate and the fourth substrate, the frame sealing glue between the third substrate and the fourth substrate forms a fourth accommodating space, and the fourth accommodating space is filled with the fourth bistable cholesteric liquid crystal.

In some possible implementations, multiple support retaining walls are provided between the first substrate and the second substrate and multiple support retaining walls are provided between the third substrate and the fourth substrate, the multiple support retaining walls are provided at intervals, and the multiple support retaining walls have a cross shape.

An embodiment of the present disclosure further provides a display device, including the electronic paper display screen according to any one of the above implementations.

An embodiment of the present disclosure further provides a method for manufacturing the electronic paper display screen, including: forming a first substrate and a second substrate respectively, wherein the first substrate is provided with multiple first electrodes arranged along a first direction, the second substrate is provided with multiple second electrodes arranged along a second direction, at least one of the first substrate and the second substrate is further provided with multiple metal wires, the metal wires are connected to the electrodes of the substrate to which the metal wires belong, and the metal wires are integrally overlapped with the electrodes of the substrate to which the metal wires belong, or the metal wires are connected to at least one connection point on the electrodes of the substrate to which the metal wires belong; aligning the first substrate with the second substrate, and injecting liquid crystal between the first substrate and the second substrate; and attaching an electrophoretic electronic paper screen below the first substrate.

Other aspects will become apparent upon reading and understanding of accompanying drawings and the detailed description.

DESCRIPTION OF REFERENCE SIGNS IN THE DRAWING

Figure 1:
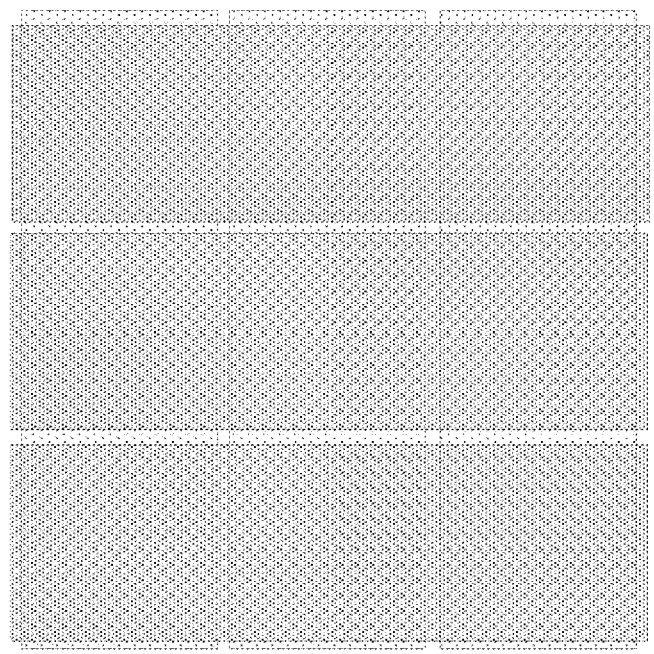
FIG. 1 is a schematic diagram of a structure of upper and lower substrates of a passively driven display region.

| | | |
|---|---|---|
| 10-first base; | 11-first metal layer; | 12-first passivation layer; |
| 13-first electrode layer; | 20-second base; | 21-black matrix; |
| 22-second metal layer; | 23-second passivation layer; | 24-second electrode layer; |
| 25-third passivation layer; | 26-support retaining wall; | 211-first black matrix; |
| 212-second black matrix; | a-distance; | w1, w2, w-width; |
| 211a-first region; | 211b-second region; | 2111-first side; |
| 2112-second side;; | 2121-third side; | 2122-fourth side; |
| 27-frame sealing glue; | 28-first bistable cholesteric liquid crystal; | 29-second bistable cholesteric liquid crystal; |
| 110-first metal wire; | 111-second protrusion; | 220-second metal wire; |
| 221-first protrusion; | 231-second opening; | 121-third opening; |
| 213-third protrusion; | 122-first opening; | |

DETAILED DESCRIPTION

The embodiments of the present disclosure will be described below with reference to the drawings in detail. The implementation modes may be implemented in various forms. Those of ordinary skills in the art can easily understand such a fact that implementation modes and contents may be transformed into various forms without departing from the purpose and scope of the present disclosure. Therefore, the present disclosure should not be explained as being limited to the contents recorded in the following implementation modes only. The embodiments in the present disclosure and features in the embodiments may be combined with each other randomly in a case of no conflict.

In the drawings, sometimes for sake of clarity, sizes of constituent elements, thicknesses of layers or areas may be exaggerated. Therefore, the implementation modes of the present disclosure are not always limited to the sizes, and the shapes and sizes of the components in the drawings do not reflect actual scales. In addition, the drawings schematically show ideal examples, and implementation modes of the present disclosure are not limited to the shapes or values shown in the drawings.

Ordinal numerals such as "first", "second" and "third" in the present disclosure are set to avoid confusion between constituent elements, but not intended for restriction in quantity.

In the present disclosure, sometimes for sake of convenience, wordings "central", "up", "down", "front", "rear", "vertical", "horizontal", "top", "bottom", "inside", "outside" and the like indicating directional or positional relationships are used for illustrating positional relationships between constituent elements with reference to the drawings. These wordings are not intended to indicate or imply that involved devices or elements must have specific orientations and be structured and operated in the specific orientations but only to facilitate describing the present specification and simplify the description, and thus should not be understood as limitations on the present disclosure. The position relationship between the constituent elements may be appropriately varied according to directions according to which the constituent elements are described. Therefore, appropriate replacements based on situations are allowed, not limited to the expressions in this specification.

In the present disclosure, unless otherwise specified and defined, terms "mounting", "mutual connection" and "connection" should be understood in a broad sense. For example, it may be a fixed connection, a detachable connection or an integrated connection, it may be a mechanical connection or an electrical connection, or may be a direct connection, an indirect connection through intermediate components, or an internal communication between two components. For those of skills in the art, the meanings of the above terms in the present disclosure may be understood according to situations.

In the present disclosure, "connection" includes a case where constituent elements are connected through an element with a certain electrical action. "The element with the certain electric action" is not particularly limited as long as electric signals between the connected constituent elements may be sent and received. Examples of "the element with the certain electric action" not only include electrodes and wires, but also include switching elements (such as transistors), resistors, inductors, capacitors, other elements with various functions, etc.

In the present disclosure, "parallel" refers to a state that an angle formed by two straight lines is above −10° and below 10°, and thus may also include a state that the angle is above −5° and below 5°. In addition, "vertical" refers to a state in which an angle formed by two straight lines is above 80° and below 100°. Therefore, it also includes a state in which an angle is above 85° and below 95°.

In the present disclosure, "film" and "layer" are interchangeable. For example, sometimes "conductive layer" may be replaced by "conductive film". Similarly, sometimes "insulating film" may be replaced by "insulating layer".

Electronic paper display technology includes Electrophoresis Display (EPD) technology, cholesteric liquid crystal display technology and so on. As shown in FIG. 1, a passively driven cholesteric liquid crystal display includes an upper substrate and a lower substrate provided oppositely, and a cholesteric liquid crystal layer provided between the upper substrate and the lower substrate. Indium tin oxide (ITO) coated on an inner side surface of the lower substrate forms column (row) electrodes, and ITO coated on an inner side surface of the upper substrate forms row (column) electrodes. An intersection point of any one row electrode with any one column electrode is one pixel. Each pixel is controlled by an electric field applied by intersected row and column electrodes such that cholesteric liquid crystal in each pixel displays a color corresponding to an intensity of the applied electric field. By using this row-column intersection driving mode, the number of leads may be greatly reduced, wirings are convenient for designers and device costs may be reduced. However, since ITO material is oxide, which has larger resistance, the resistance difference between pixels in a region close to a control drive circuit and a region away from the control drive circuit in the display region is large, which leads to signal delay and affects display effects.

At least one embodiment of the present disclosure provides an electronic paper display screen, including a first electronic paper screen and a second liquid crystal display layer provided on the first electronic paper screen, wherein the first electronic paper screen is an electrophoretic electronic paper screen and the second liquid crystal display layer is a cholesteric liquid crystal display screen. The second liquid crystal display layer includes a first substrate, a second substrate and a control drive circuit. The first substrate and the second substrate are oppositely provided, wherein a surface of the first substrate facing the second substrate is provided with multiple first electrodes arranged in a first direction, and a surface of the second substrate facing the first substrate is provided with multiple second electrodes arranged in a second direction. At least one of the first substrate and the second substrate is further provided with multiple metal wires, the metal wires are respectively connected to the control drive circuit and the electrodes of the substrate to which the metal wires belong. The metal wires are integrally overlapped with the electrodes of the substrate to which the metal wires belong, or the metal wires are overlapped with at least one connection point on the electrodes of the substrate to which the metal wires belong.

In an exemplary embodiment, multiple connection points may be provided, and the multiple connection points are arranged at intervals in a direction close to or away from the control drive circuit. A connection point refers to a portion where a row (column) electrode of the substrate is overlapped with a corresponding metal wire.

In an embodiment of the present disclosure, a metal wire being integrally overlapped with an electrode of a substrate to which the metal wire belongs means that a metal wire is integrally connected to an electrode of the substrate to which the metal wire belongs. For example, when an insulating layer is provided between the metal wires and the electrodes of the substrate to which the metal wire belongs, at least one elongated opening is provided on the insulating layer, and a metal wire is integrally contacted to an electrode of the substrate to which the metal wire belongs through the elongated opening.

In an exemplary embodiment, an extending direction of the elongated opening extends is the same as that of the metal wire or the electrode, and a length of the elongated opening along the extending direction is greater than a certain threshold.

In an embodiment of the present disclosure, the control drive circuit may be a control drive chip or a control drive circuit composed of multiple cascaded shift registers.

Some embodiments of the present disclosure further provide a display device corresponding to the aforementioned electronic paper display screen and a method for manufacturing the electronic paper display screen.

In the electronic paper display screen provided in the above embodiment of the present disclosure, since the metal wires are integrally overlapped with the electrode of the substrate to which the metal wires belongs, or the metal wires are overlapped with at least one connection point on the electrodes of the substrate to which the metal wires belongs, a resistance difference between part of electrodes close to the position of the control drive circuit and part of electrodes away from the position of the control drive circuit is reduced, so that there is almost no difference in resistance between pixels in the region close to the control drive circuit in the display region and the region away from the control drive circuit in the display region, signal delay of pixels in the region away from the control drive circuit is eliminated, display effects are improved, and manufacturing processes is mature, simple and reliable.

In addition, by superimposing the cholesteric liquid crystal display screen and the electrophoretic electronic paper screen together by fusing bistable liquid crystal Bragg reflection and electrophoretic display technology, the electronic paper display screen of the embodiment of the present disclosure achieves three-dimensional color mixing so as to implements color display, thus greatly improving the display effects and application field of electronic paper products.

In an exemplary embodiment, both the first electrodes and the second electrodes may be ITO electrodes.

In an exemplary embodiment, the metal wire may be made of a metal material such as aluminum.

In an exemplary embodiment, the first direction is perpendicular to the second direction. Exemplarily, the first direction may be a horizontal direction, i.e., the x-axis direction and the second direction may be a vertical direction, i.e., the y-axis direction.

In an exemplary embodiment, the extending direction of the first electrodes may be perpendicular to the arrangement direction of the first electrodes, for example, the first electrodes are arranged in a horizontal direction, i.e., the x-axis direction, and the extending direction of the first electrodes may be a vertical direction, i.e., the y-axis direction. The extending direction of the second electrodes may be perpendicular to the arrangement direction of the second electrodes, for example, the second electrodes may be arranged in the vertical direction, i.e., the y-axis direction, and the extending direction of the second electrodes may be the horizontal direction, i.e., the x-axis direction.

Figure 2:
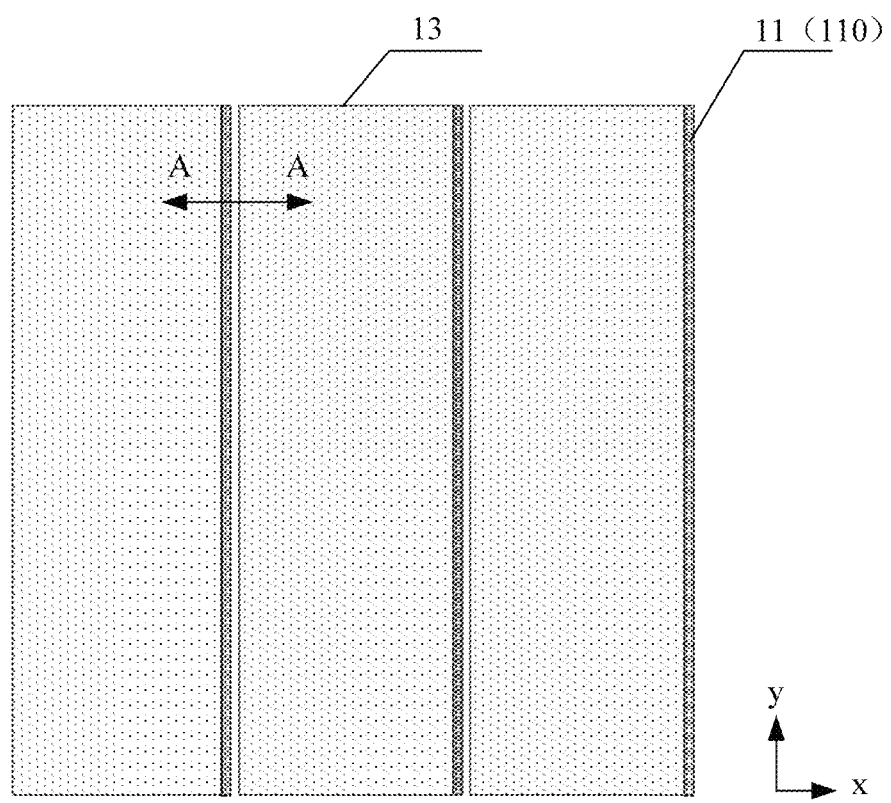
FIG. 2 is a schematic diagram of a planar structure of a first substrate in an electronic paper display screen according to an embodiment of the present disclosure.
Figure 3:
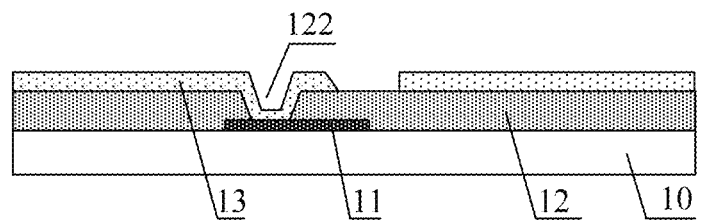
FIG. 3 is a schematic diagram of a sectional structure of a region AA of the first substrate shown in FIG. 2.

In an exemplary embodiment, as shown in FIGS. 2 and 3, the first substrate may include a first base 10, a first metal layer 11 provided on the first base 10, a first passivation layer 12 provided on the first metal layer 11, and a first electrode layer 13 provided on the first passivation layer 12.

Figure 4:
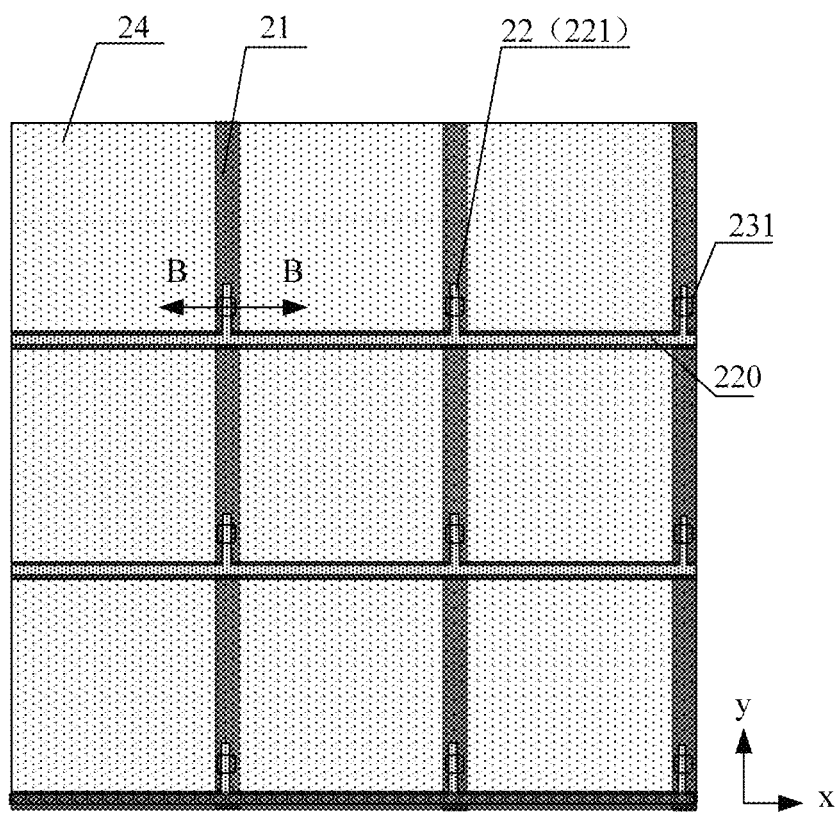
FIG. 4 is a schematic diagram of a planar structure of a second substrate according to an embodiment of the present disclosure.
Figure 5:
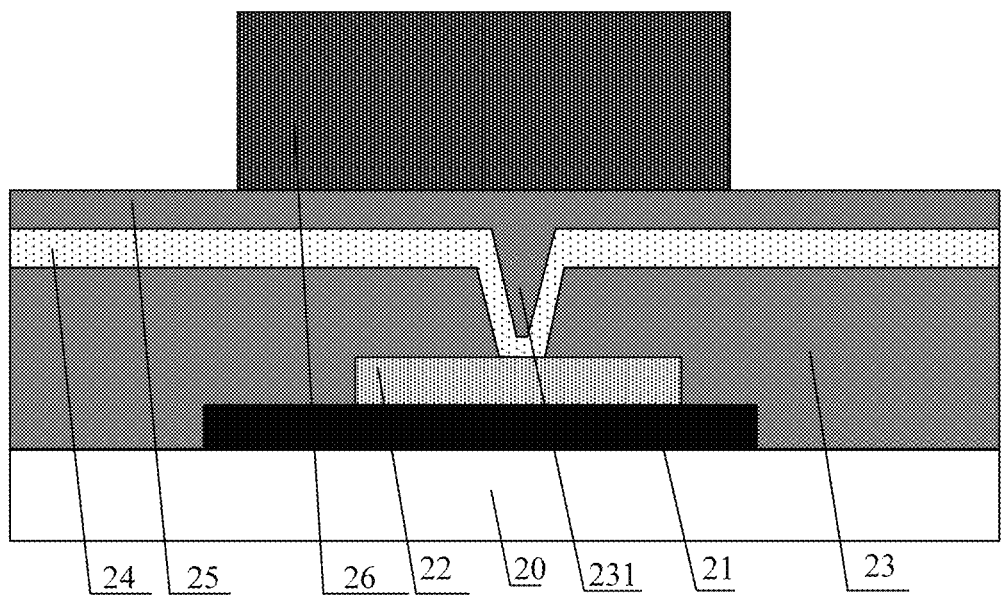
FIG. 5 is a schematic diagram of a sectional structure of a region BB of the second substrate shown in FIG. 4.

As shown in FIGS. 4 and 5, the second substrate may include a second base 20, a second metal layer 22 provided on the second base 20, a second passivation layer 23 provided on the second metal layer 22, and a second electrode layer 24 provided on the second passivation layer 23.

The first metal layer 11 includes multiple first metal wires 110, and the second metal layer 22 includes multiple second metal wires 220. The first electrode layer 13 includes the first electrodes described above, and the second electrode layer 24 includes the second electrodes described above. The first metal wires 110 are connected to the first electrodes through an opening in the first passivation layer 12, and the second metal wires 220 are connected to the second electrodes through an opening in the second passivation layer 23.

In an exemplary embodiment, the first passivation layer 12 is provided with at least one elongated first opening 122, wherein the first metal wires 110 are integrally overlapped with the first electrodes through the at least one elongated first opening 122, and an orthographic projection of the first metal wires 110 on the first base 10 includes an orthographic projection of the at least one first opening 122 on the first base 10.

In an exemplary embodiment, as shown in FIGS. 4 and 5, the second passivation layer 23 is provided with at least one second opening 231, at least one first protrusion 221 is provided on a side of the second metal wires 220 facing the at least one second opening 231 in a plane parallel to the second base 20. Each of the first protrusions 221 is overlapped with a second electrode through at least one second opening 231, and a place where the second electrode is connected to the first protrusion 221 is referred to as a connection point, that is, each of the first protrusions 221 is overlapped with one connection point of the second electrode through at least one second opening 231.

In an exemplary embodiment, the at least one first protrusion 221 is in one-to-one correspondence with the at least one second opening 231.

In this embodiment, a first protrusion 221 is a portion of a second metal wire 220 extending from its body in a second direction. In some examples, the first protrusion 221 may be integrally formed with the second metal wire 220, so as to be conveniently manufactured. In other examples, the first protrusion 221 may not be integrally formed with the second metal wire 220, for example, the first protrusion 221 may be made of another conductive material, and the first protrusion 221 is overlapped with the second metal wire 220.

In an exemplary embodiment, a black matrix 21 is further provided on at least one of the first substrate and the second substrate, wherein an orthographic projection of the black matrix 21 on the first base 10 includes an orthographic projection of the metal wires on the first base 10.

In an exemplary embodiment, as shown in FIGS. 4 and 5, the second substrate may further include a black matrix 21 provided between the second base 20 and the second metal layer 22, wherein an orthographic projection of the black matrix 21 on the second base 20 includes an orthographic projection of the first metal wires 110 on the second base 20, and includes an orthographic projection of the second metal wires 220 on the second base 20.

Figure 6:
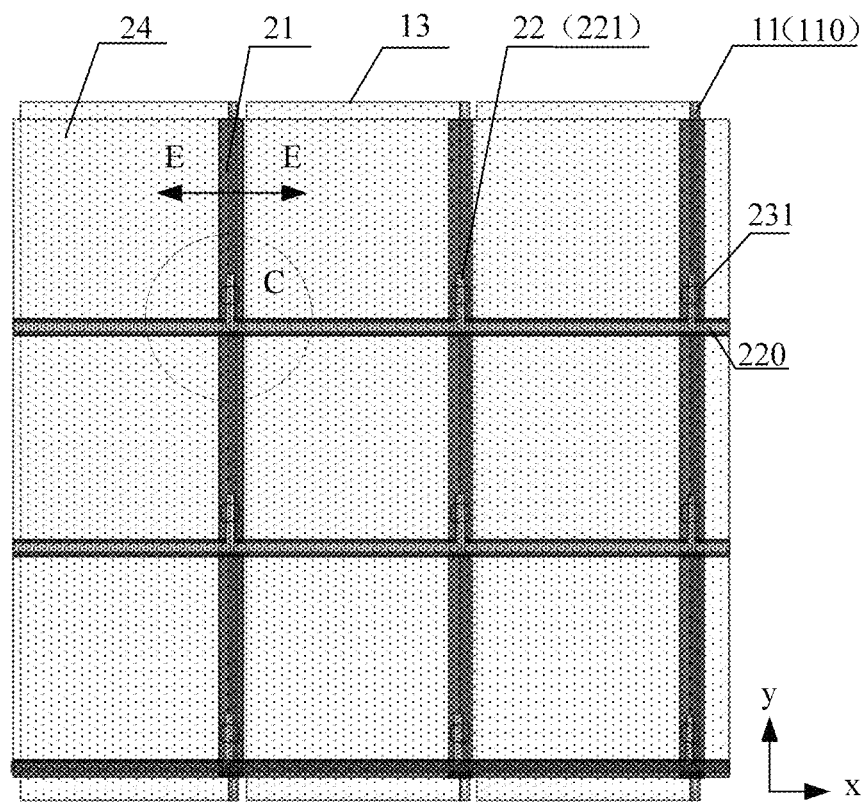
FIG. 6 is a schematic diagram of a structure after the first substrate shown in FIG. 2 and the second substrate shown in FIG. 4 are aligned.
Figure 7:
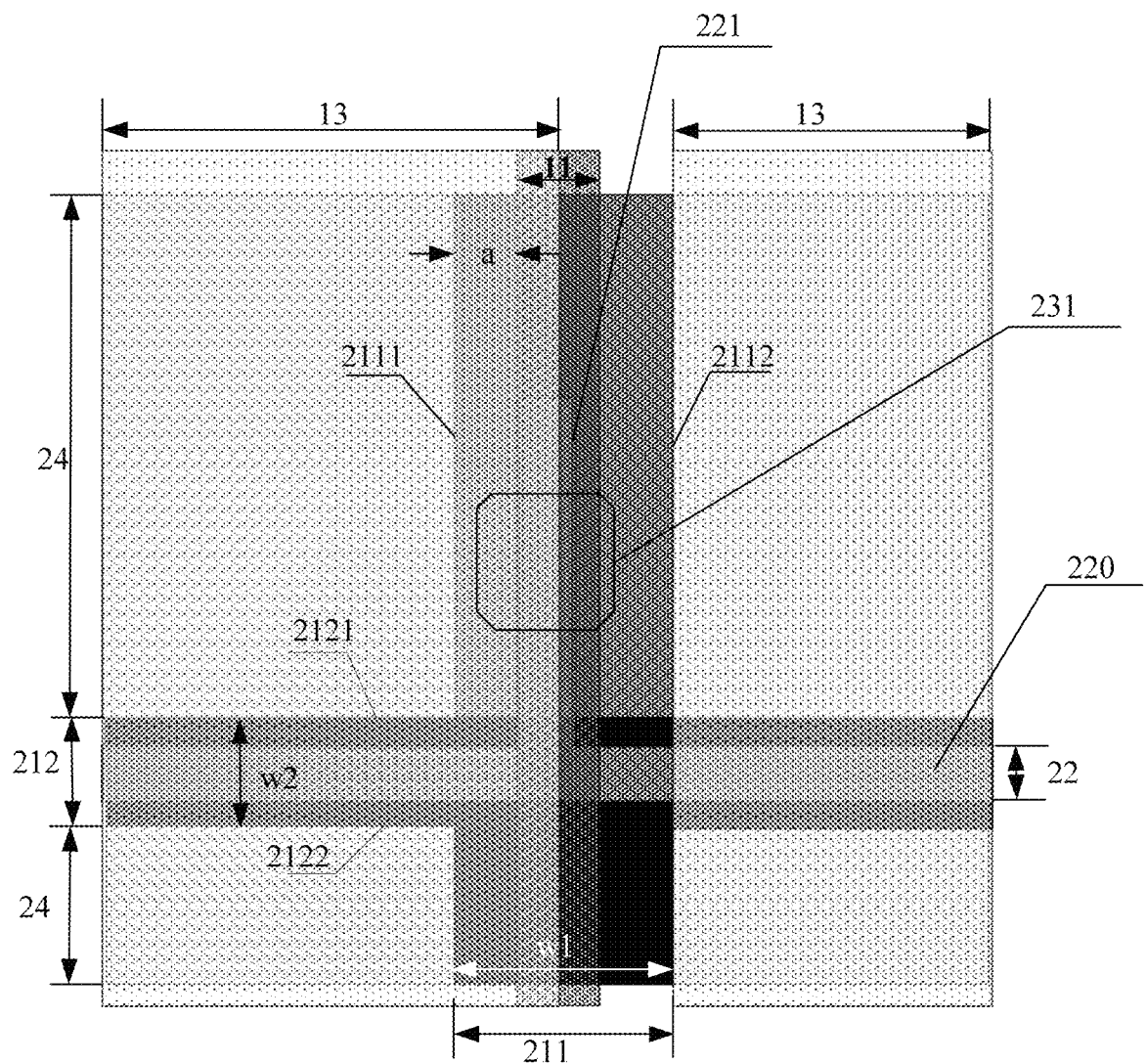
FIG. 7 is an enlarged schematic diagram of a structure of a region C of the electronic paper display screen of FIG. 6.

In an exemplary embodiment, as shown in FIGS. 6 and 7, the black matrix 21 may include a first black matrix 211 arranged along a first direction and a second black matrix 212 arranged along a second direction, wherein a width w1 of the first black matrix 211 along the first direction is greater than a width w2 of the second black matrix 212 along the second direction.

In an exemplary embodiment, an average width of the first black matrix 211 along the first direction is greater than an average width of the second black matrix 212 along the second direction in a case that either of the first black matrix 211 and the second black matrix 212 has a variable width or both of the first black matrix 211 and the second black matrix 212 have variable widths.

In an exemplary embodiment, as shown in FIG. 7, the first black matrix 211 may include a first side 2111 and a second side 2112 provided oppositely along the first direction, wherein a distance a between an orthographic projection of the first side 2111 on the first base 10 and an orthographic projection of a first metal wire 110 adjacent to the first side 2111 on the first base 10 is greater than or equal to a preset first distance, and an orthographic projection of the second side 2112 on the first base 10 coincides with an orthographic projection of a first electrode adjacent to the second side 2112 on the first base 10 close to a boundary of the second side 2112.

In an exemplary embodiment, the preset first distance may be an alignment accuracy of the upper substrate and the lower substrate.

In an exemplary embodiment, the first distance may be about 3.5 microns in view of the alignment accuracy of the upper and lower substrates being 3.5 microns, so as to ensure that there is no phenomenon of light leakage between adjacent first electrodes and that the metal wires do not reflect light.

In an exemplary embodiment, the second black matrix 212 may include a third side 2121 and a fourth side 2122 provided oppositely along the second direction, wherein an orthographic projection of the third side 2121 on the first base 10 coincides with an orthographic projection of a second electrode adjacent to the third side 2121 on the first base 10 close to a boundary of the third side 2121, and an orthographic projection of the fourth side 2122 on the first base 10 coincides with an orthographic projection of a second electrode adjacent to a fourth side 2122 close to the boundary of the fourth side 2122 on the first base 10 to ensure a maximum aperture ratio.

In an exemplary embodiment, the second electrodes are arranged at intervals along the second direction, there is a gap between adjacent second electrodes, and an orthographic projection of the second black matrix 212 on the first base 10 coincides with an orthographic projection of the gap on the first base 10.

In an exemplary embodiment, the second substrate may further include a third passivation layer 25 provided on the second electrode layer 24 and a support retaining wall 26 provided on the third passivation layer 25. Exemplarily, a thickness of the third passivation layer 25 may be 500 angstroms so that the support retaining wall 26 is better adhered to the second electrodes.

In an exemplary embodiment, the electronic paper display screen may further include a first lead and a second lead, wherein the first metal wire 110 is connected to the drive control circuit the first lead and the second metal wire 220 is connected to the drive control circuit through the second lead, and the first lead and the second lead may be made of a material such as ITO or metal.

Figure 8:
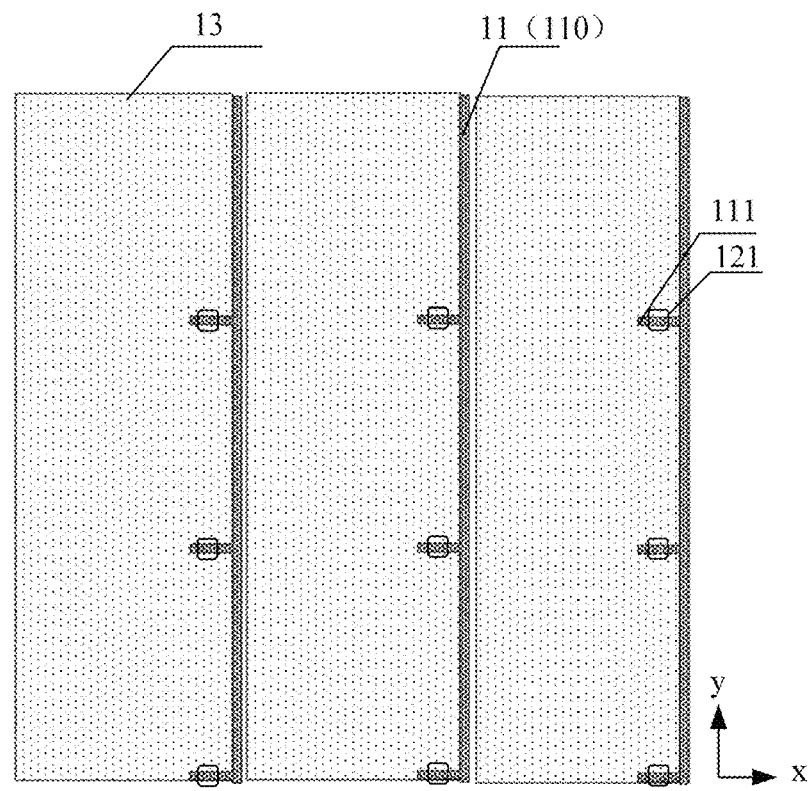
FIG. 8 is a schematic diagram of a planar structure of a first substrate in another electronic paper display screen according to the present disclosure.

In another exemplary embodiment, as shown in FIG. 8, the first passivation layer 12 is provided with at least one third opening 121, at least one second protrusion 111 is provided on a side of the first metal wire 110 facing the at least one third opening 121 in a plane parallel to the first base 10, each of the second protrusions 111 is overlapped with a first electrode through at least one third opening 121, and a place where the first electrode is connected to the second protrusion 111 is referred to as a connection point, that is, each of the second protrusions 111 is overlapped with one connection point of a first electrode through at least one third opening 121.

In an exemplary embodiment, the at least one second protrusion 111 is in one-to-one correspondence with the at least one third opening 121.

In this embodiment, a second protrusion 111 is a portion of a first metal wire 110 extending from its body in a first direction. In some examples, the second protrusion 111 may be integrally formed with the first metal wire 110 to be conveniently manufactured. In some other examples, the second protrusion 111 may not be integrally formed with the first metal wire 110, for example, the second protrusion 111 may be of another conductive material, and the second protrusion 111 is overlapped with the first metal wire 110.

Figure 9:
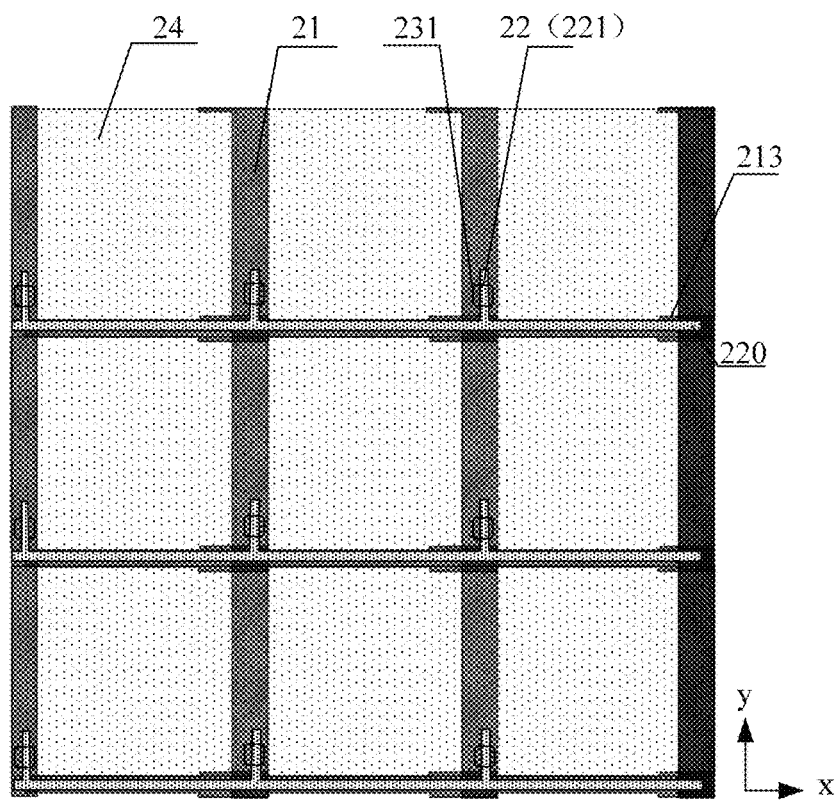
FIG. 9 is a schematic diagram of a planar structure of a second substrate in another electronic paper display screen according to the present disclosure.

In an exemplary embodiment, as shown in FIG. 9, the second passivation layer 23 is provided with at least one second opening 231, at least one first protrusion 221 is provided on a side of the second metal wire 220 facing the at least one second opening 231 in a plane parallel to the second base 20, each of the first protrusions 221 is overlapped with a second electrode through one second opening 231, and the place where the second electrode is connected to the first protrusion 221 is referred to as a connection point, that is, each of the first protrusions 221 is overlapped with one connection point of a second electrode through at least one second opening 231.

Figure 10:
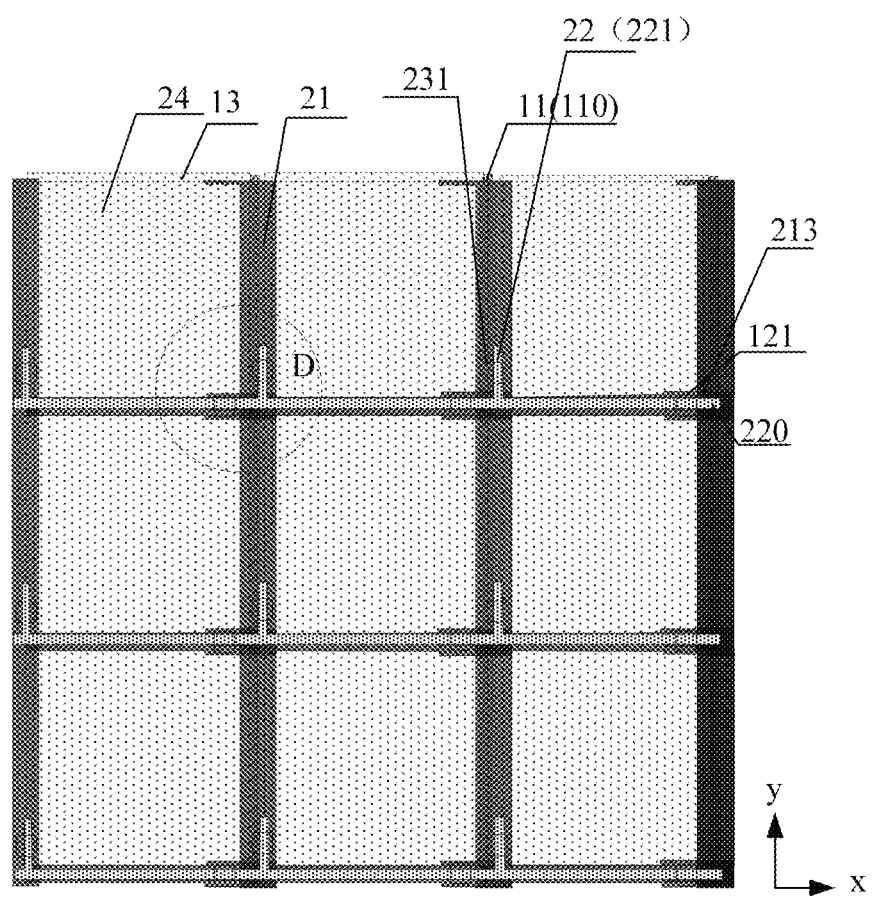
FIG. 10 is a schematic diagram of a structure after the first substrate shown in FIG. 8 and the second substrate shown in FIG. 9 are aligned.

In an exemplary embodiment, as shown in FIG. 10, the second substrate may further include a black matrix 21 provided between the second base 20 and the second electrode layer 24, and an orthographic projection of the black matrix 21 on the second base 20 includes an orthographic projection of the first metal wires 110 on the second base 20, and includes an orthographic projection of the second metal wires 220 on the second base 20.

Figure 11:
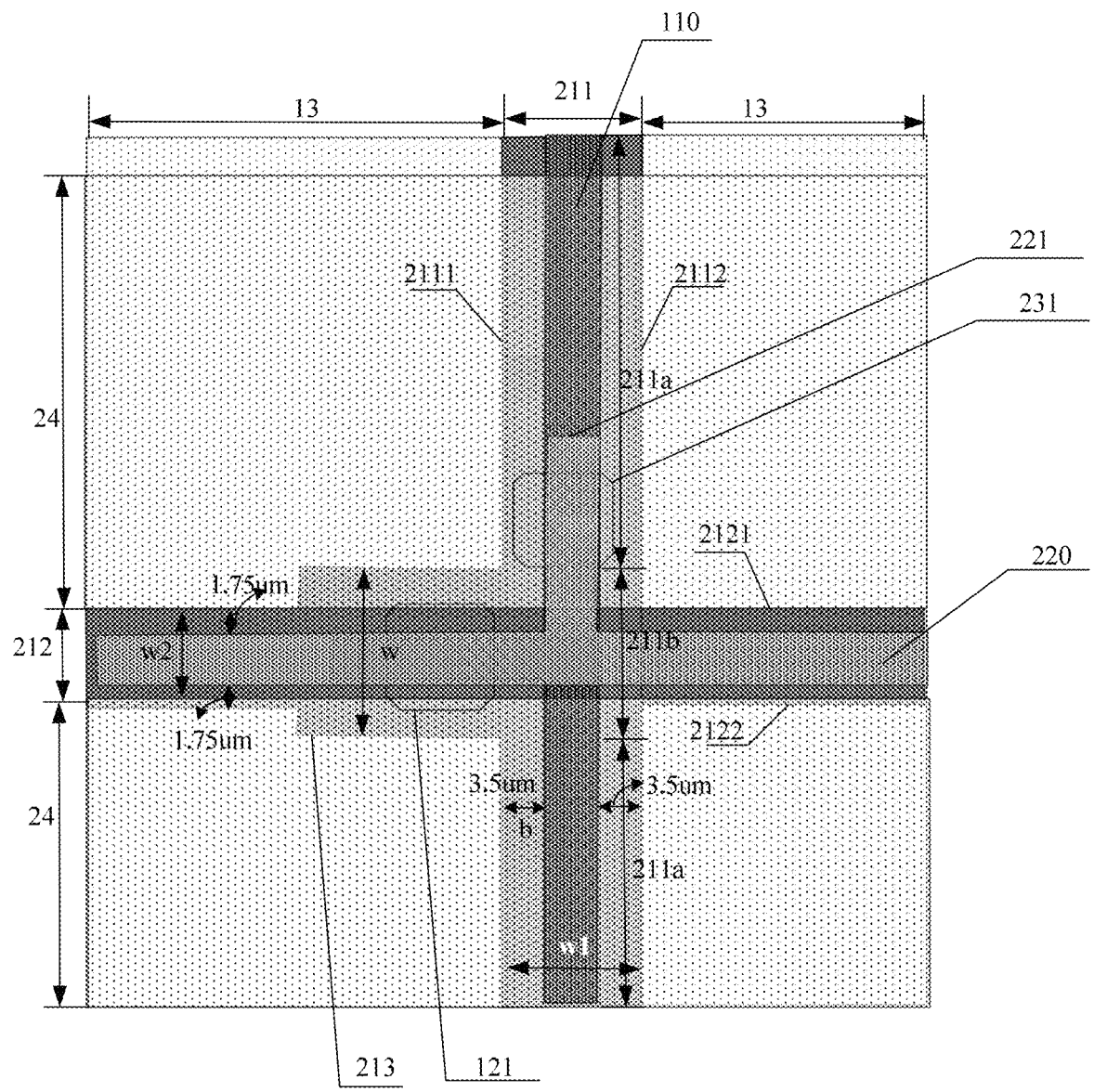
FIG. 11 is an enlarged schematic diagram of a structure of a region D of the electronic paper display screen shown in FIG. 10.

In an exemplary embodiment, as shown in FIGS. 10 and 11, the black matrix 21 may include multiple first black matrices 211 arranged along the first direction and multiple second black matrices 212 arranged along the second direction. Each first black matrix 211 extends in the second direction, each second black matrix 212 extends in the first direction. The first black matrix 211 includes at least one first region 211a and at least one second region 211b, wherein a width w1 of the first region 211a along the first direction is greater than a width w2 of the second black matrix 212 along the second direction. The second region 211B is provided with at least one third protrusion 213 along a direction of a second protrusion, wherein an orthographic projection of the third protrusion 213 on the first base 10 includes an orthographic projection of the second protrusion 111 on the first base 10, and a width w of the third protrusion 213 along the second direction is greater than a width w2 of the second black matrix 212 along the second direction. Since a protrusion structure is also protruded in the first direction while the first metal wires 110 of the first substrate extend in the second direction, and the protrusion structure is overlapped with a corresponding first electrode through the opening, the second region 211B is provided with at least one third protrusion 213 in the first direction, and the orthographic projection of the at least one third protrusion 213 on the first base 10 includes the orthographic projection of the at least one second protrusion 111 on the first base 10.

In an exemplary embodiment, the first black matrix 211 may include multiple first regions 211a provided at intervals and multiple second regions 211b provided at intervals.

In an exemplary embodiment, the first regions 211a and the second regions 211b are alternately provided.

In an exemplary embodiment, the orthographic projection of the at least one third protrusion 213 on the first base 10 includes an orthographic projection of the at least one third opening 121 on the first base 10.

In an exemplary embodiment, as shown in FIGS. 10 and 11, a first region 211a may include a first side 2111 and a second side 2112 provided oppositely along the first direction. An orthographic projection of the first side 2111 on the first base 10 coincides with an orthographic projection of a first electrode adjacent to the first side 2111 on the first base 10 close to a boundary of the first side 2111, and an orthographic projection of the second side 2112 on the first base 10 coincides with an orthographic projection of a first electrode adjacent to a second side 2112 close to a boundary of the second side 2112 on the first base 10 to ensure a maximum aperture ratio.

In an exemplary embodiment, a distance b between the orthographic projection of the first side 2111 on the first base 10 and an orthographic projection of a first metal wire 110 adjacent to the first side 2111 on the first base 10 is greater than or equal to a preset first distance. In an exemplary embodiment, the preset first distance may be the alignment accuracy of the upper substrate and the lower substrate. Since the black matrix 21 of the second substrate needs to be aligned with the first metal wires 110 of the first substrate, considering the alignment deviation, a width of the first black matrix 211 along the first direction is made wider, as shown in FIG. 11. For example, considering that the alignment accuracy of the upper and lower substrates is 3.5 microns, the first distance may be about 3.5 microns, so as to ensure that there is no phenomenon of light leakage between adjacent first electrodes and the metal wires do not reflect light.

In an exemplary embodiment, as shown in FIGS. 10 and 11, the second black matrix 212 may include a third side 2121 and a fourth side 2122 provided oppositely along the second direction. An orthographic projection of the first side 2111 on the first base 10 coincides with an orthographic projection of a first electrode adjacent to the first side 2111 on the first base 10 close to the boundary of the first side 2111. An orthographic projection of the third side 2121 on the first base 10 coincides with an orthographic projection of a second electrode adjacent to the third side 2121 on the first base 10 close to a boundary of the third side 2121. An orthographic projection of the fourth side 2122 on the first base 10 coincides with an orthographic projection of a second electrode adjacent to the fourth side 2122 close to a boundary of the fourth side 2122 on the first base 10 to ensure a maximum aperture ratio.

In this embodiment, since both the black matrix 21 and the second metal wires 220 are located on the second substrate, and there is no problem of alignment deviation between the black matrix 21 and the second metal wires 220 due to the alignment of the first substrate and the second substrate, the width w2 of the second black matrix 212 along the second direction may be made narrower, as shown in FIG. 11. For example, a distance between the orthographic projection of the third side 2121 on the first base 10 and an orthographic projection of a second metal wire 220 adjacent to the third side 2121 on the first base 10 may be approximately 1.75 microns.

Figure 12:
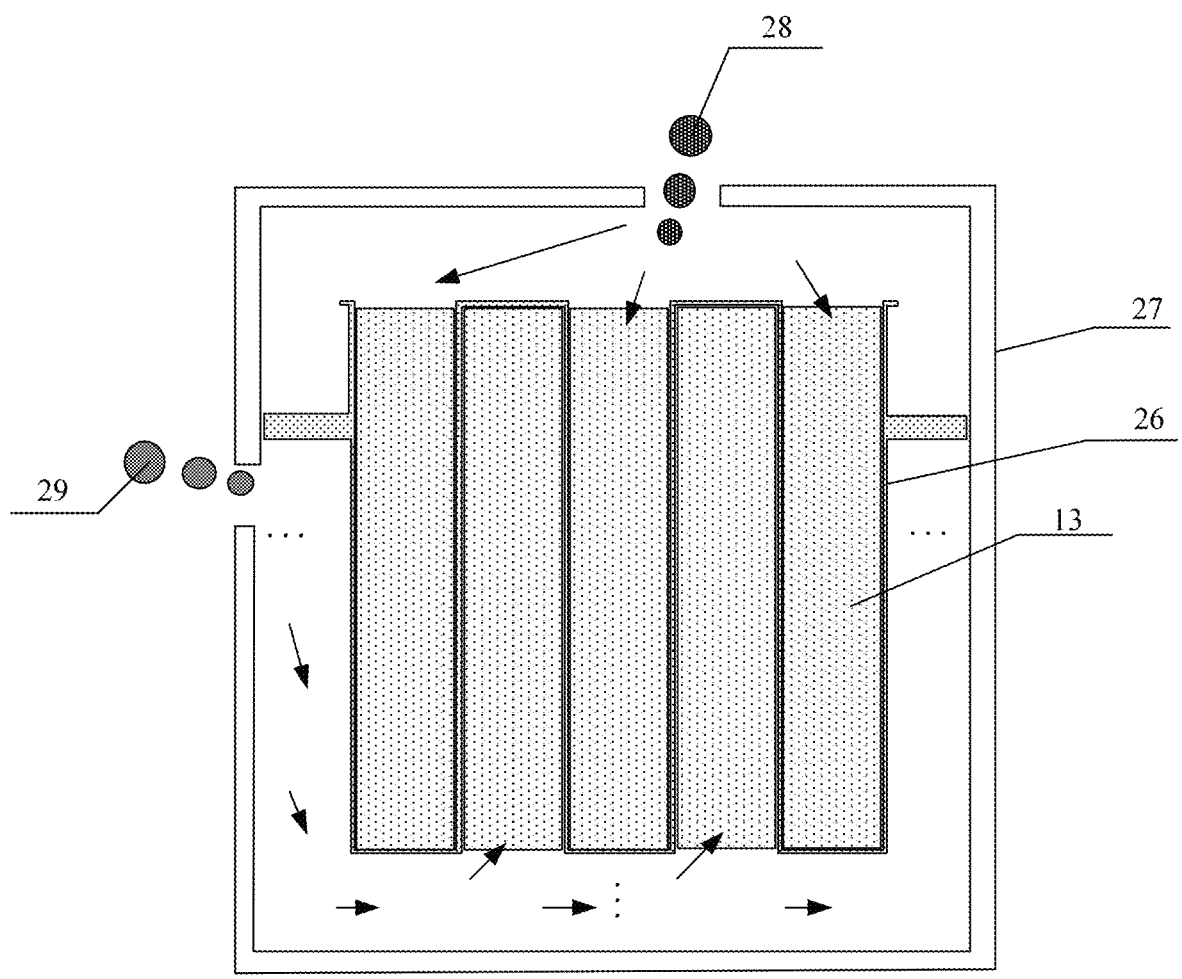
FIG. 12 is a schematic diagram of a structure of a support retaining wall according to the present disclosure.

In an exemplary embodiment, as shown in FIG. 12, the electronic paper display screen may further include a frame sealing glue 27, a support retaining wall 26, first bistable cholesteric liquid crystal 28 and second bistable cholesteric liquid crystal 29 provided between the first substrate and the second substrate. The support retaining wall 26 is in a curved strip shape (the support retaining wall 26 is curved, e.g., S-shaped, in a plane parallel to the substrate, and the support retaining wall is elongated in a plane perpendicular to the substrate). One side of the support retaining wall 26 and the frame sealing glue 27 form a first accommodating space, the other side of the support retaining wall 26 and the frame sealing glue 27 form a second accommodating space. Two adjacent first electrodes are respectively located in the first accommodating space and the second accommodating space. The first accommodating space is filled with the first bistable cholesteric liquid crystal 28, and the second accommodating space is filled with the second bistable cholesteric liquid crystal 29.

Figure 13:
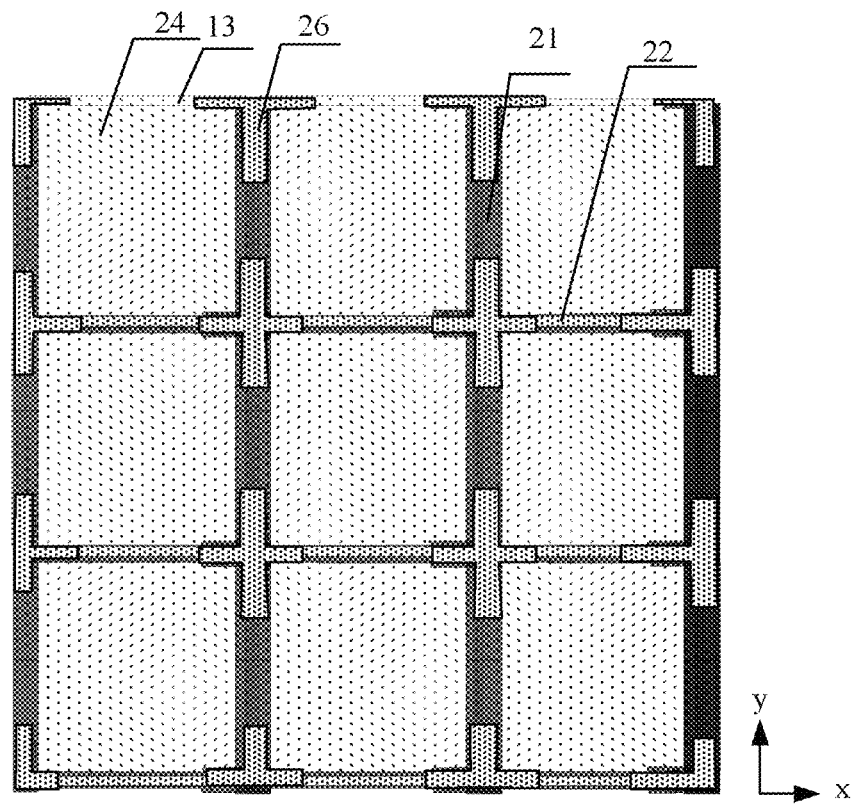
FIG. 13 is a schematic diagram of a structure of another support retaining wall according to the present disclosure.

In an exemplary embodiment, as shown in FIG. 13, the electronic paper display screen may further include a frame sealing glue 27, a support retaining wall 26, and third bistable cholesteric liquid crystal provided between the first substrate and the second substrate. The frame sealing glue 27 between the first substrate and the second substrate forms a third accommodating space filled with the third bistable cholesteric liquid crystal. The orthographic projection of the black matrix 21 (or metal wires) on the first base 10 includes an orthographic projection of the support retaining wall 26 on the first base 10.

In an exemplary embodiment, as shown in FIG. 13, multiple support retaining walls 26 may be provided between the first substrate and the second substrate. The multiple support retaining walls 26 are provided at intervals. The support retaining walls 26 may have a cross shape on a plane parallel to the substrate, a support retaining wall 26 at a side edge may also have a T shape, and a support retaining wall at a corner edge may also have an L shape. In this embodiment, the support retaining walls 26 are varied from a curved strip shape to a cross shape, and are located at four corners of pixels, so that the aperture ratio and normal picture displaying will not be affected.

In an exemplary embodiment, the electronic paper display screen further includes a third liquid crystal display layer provided on the second liquid crystal display layer. The third liquid crystal display layer includes a third substrate, a fourth substrate, and a frame sealing glue 27, a support retaining wall 26, and fourth bistable cholesteric liquid crystal provided between the third substrate and the fourth substrate. The frame sealing glue 27 between the third substrate and the fourth substrate forms a fourth accommodating space filled with the fourth bistable cholesteric liquid crystal. The orthographic projection of the black matrix 21 on the first base 10 includes an orthographic projection of the support retaining wall 26 on the first base 10.

In an exemplary embodiment, as shown in FIG. 13, multiple support retaining walls 26 may be provided between the third substrate and the fourth substrate. The multiple support retaining walls 26 are provided at intervals. The support retaining walls 26 may have a cross shape on a plane parallel to the substrate. In this embodiment, the support retaining walls are varied from a curved strip shape to a cross shape, and are located at four corners of pixels, so that the aperture ratio and normal picture displaying will not be affected.

In an exemplary embodiment, the first bistable cholesteric liquid crystal, the second bistable cholesteric liquid crystal, the third bistable cholesteric liquid crystal, and the fourth bistable cholesteric liquid crystal may all be bistable cholesteric liquid crystal (CLC).

Cholesteric liquid crystal has four different molecular arrangement structures. The first is Planar Texture, which is called P state; the second is Focal Conic Texture, which is called FC state; the third is Homeotropic Texture, or field-induced nematic state, which is called H state; and the fourth is Transient Planar Texture, which is called P* state.

If an electric field with certain intensity is applied to P-state cholesteric liquid crystal, the cholesteric liquid crystal may be transformed from the P-state to the FC-state, and its spiral axis distribution is disorderly, and its basic orientation is parallel to the substrate. When the electric field becomes zero, the FC state constitutes another zero-field stable state under certain conditions. Periodicity of the spiral structure of cholesteric liquid crystal in the FC state no longer exists, showing a multi-domain state, but the spiral structure in each domain still exists, so it scatters the incident light. If an intense enough electric field is applied to the liquid crystal, the liquid crystal will change to the H state, in which the molecules are all aligned along a direction of the electric field, and the liquid crystal is transparent. As for cholesteric liquid crystal in the H state, when the voltage drops rapidly to zero, the liquid crystal molecules return to the P state, and when the voltage decreases slowly, the liquid crystal molecules change into the FC state. Among these states of cholesteric liquid crystal, only the P state and the FC state are stable in absence of external field. Vertically aligned states exist only when there is an external field, and the P* state mainly appears in a transition process of liquid crystal molecules from a vertically aligned state to a planar state. A reflection state in the P state and a scattering state in the FC state constitute a group of contrast states.

In an exemplary embodiment, when the first bistable cholesteric liquid crystal and the third bistable cholesteric liquid crystal are in the P state, the display presents the CLC selectively reflected visible light color-green, and when the second bistable cholesteric liquid crystal and the fourth bistable cholesteric liquid crystal are in the P state, the display presents the CLC selectively reflected visible light color-blue.

Figure 14:
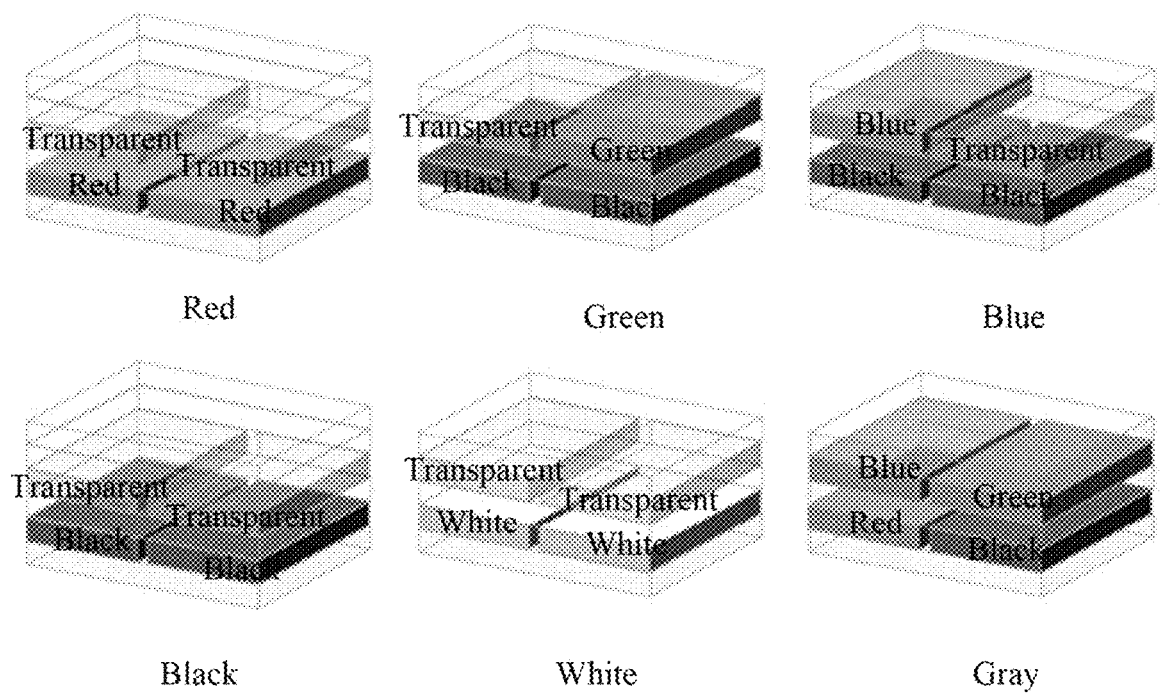
FIG. 14 is a schematic diagram of a color mixing principle of an electronic paper display screen with a two-layer superimposed structure according to the present disclosure.

In an electronic paper display screen having a two-layer superimposed structure consisting of a first electronic paper screen (electrophoretic electronic paper screen) and a second liquid crystal display layer (cholesteric liquid crystal display screen), the second liquid crystal display layer may accurately control deflection of the liquid crystal by the first electrodes of the first substrate and the second electrodes of the second substrate by driving the control chip to provide different signals to the first metal wires 110 and the second metal wires 220 respectively, thus implementing the blue-green two-color display. As shown in FIG. 14, when the second liquid crystal display layer on the upper layer displays transparent color and the first electronic paper screen on the bottom layer displays red, white or black, red, white or black is displayed externally as a whole. When the second liquid crystal display layer on the upper layer displays green or blue and the electric first electronic paper screen on the bottom layer displays black, green or blue is displayed externally as a whole. When the second liquid crystal display layer on the upper layer displays green+blue, and the first electronic paper screen on the bottom layer displays red+black, gray is displayed externally as a whole. Therefore, the electronic paper display screen with the two-layer superimposed structure implements three-dimensional color mixing and achieves the purpose of color display.

Figure 15:
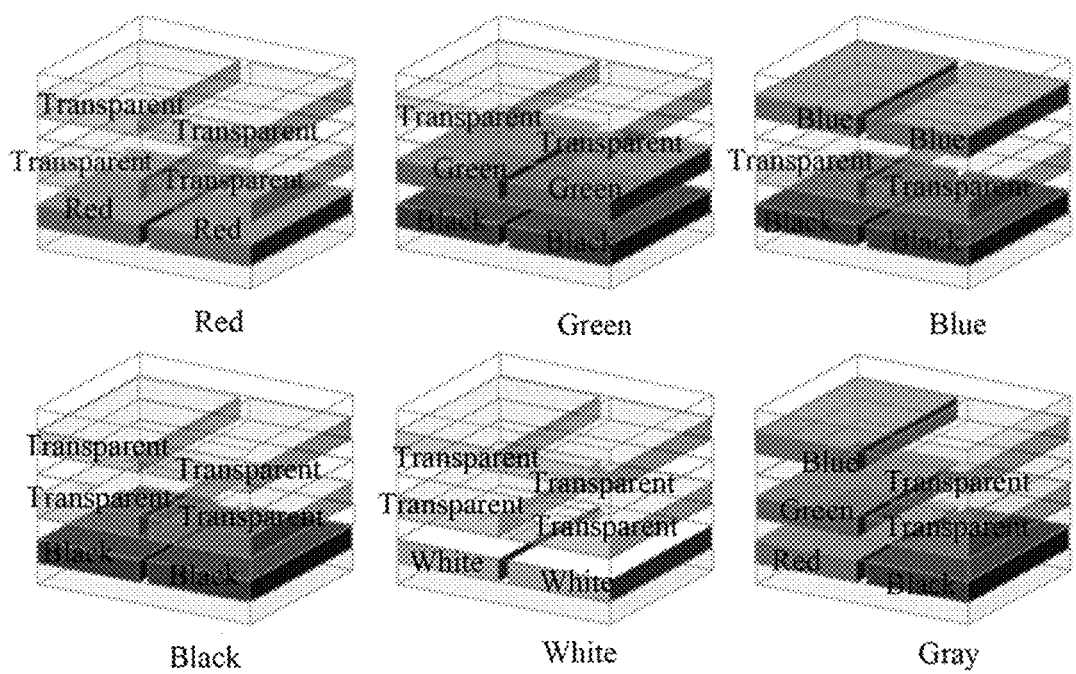
FIG. 15 is a schematic diagram of a color mixing principle of an electronic paper display screen with a three-layer superimposed structure according to the present disclosure.

In an electronic paper display screen having a three-layer superimposed structure consisting of a first electronic paper screen (electrophoretic electronic paper screen), a second liquid crystal display layer (cholesteric liquid crystal display screen) and a third liquid crystal display layer (cholesteric liquid crystal display screen), only one liquid crystal may be injected into the two layers of cholesteric liquid crystal display screens respectively to display blue or green. As an example, as shown in FIG. 15, the first electronic paper screen as the bottom layer is an electrophoretic electronic paper, the second liquid crystal display layer in the middle is filled with green bistable cholesteric liquid crystal, and the liquid crystal cell of the third liquid crystal display layer as the top layer is filled with blue bistable cholesteric liquid crystal. When the second liquid crystal display layer in the middle and the third liquid crystal display layer in the uppermost layer display transparent color and the first electronic paper screen in the bottom layer displays red, white or black, red, white or black is also displayed externally as a whole. When the first electronic paper screen as the bottom layer displays black, the second liquid crystal display layer in the middle displays green, and the third liquid crystal display layer as the top layer displays transparent color, green is displayed externally as a whole. When the first electronic paper screen as the bottom layer displays black, the second liquid crystal display layer in the middle displays transparent color, and the third liquid crystal display layer as the top layer displays blue, blue is displayed externally as a whole. When the first electronic paper screen as the bottom layer displays red+black, the second liquid crystal display layer in the middle displays green+transparent color, and the third liquid crystal display layer as the top layer displays blue+transparent color, gray is displayed externally as a whole. Therefore, the electronic paper display screen with the three-layer superimposed structure realizes three-dimensional color mixing and achieves the purpose of color display.

The technical solution of this embodiment will be described below through a process for manufacturing the electronic paper display screen according to this embodiment. The "patterning process" mentioned in this embodiment includes processes such as film layer deposition, photoresist coating, mask exposure, development, etching, and photoresist stripping. Processes such as sputtering, evaporation, chemical vapor deposition may be used for deposition, which are not limited herein. In the description of this embodiment, it should be understood that a "thin film" refers to a layer of thin film manufactured through a certain material on a substrate by using a deposition or coating process. If the patterning process is not needed by the "thin film" throughout the preparation process, the "thin film" may also be referred to as a "layer". If the "thin film" further needs a patterning process throughout the manufacturing process, it is called a "thin film" before the patterning process and a "layer" after the patterning process. The "layer" after the patterning process includes at least one "pattern".

A process for manufacturing the electronic paper display screen of this embodiment mainly includes the following steps: (I) manufacturing a first substrate and a second substrate respectively; (II) aligning the first substrate with the second substrate, and injecting liquid crystal thereinto as required; and (III) attaching an electrophoretic electronic paper screen below the first substrate.

The step of manufacturing the first substrate in step (I) includes steps (1) to steps (3):

(1) Depositing a first metal thin film on the first base 10, and patterning the first metal thin film by a patterning process, to form a pattern of a first metal layer 11 on a first base 10, wherein the first metal layer 11 includes multiple first metal wires 110 arranged along a first direction.

(2) Depositing a first insulating thin film on the first base 10 on which the aforementioned structures are formed, and patterning the first insulating thin film by a patterning process, to form a pattern of a first passivation layer 12 covering the first base 10, wherein the first passivation layer 12 is used for preventing the first metal wires 110 from being corroded by first electrodes, the first passivation layer 12 includes at least one elongated first opening, and the first metal wires 110 are exposed by the at least one elongated first opening.

(3) Depositing a first transparent conductive thin film on the first base 10 on which the aforementioned structures are formed, and patterning the first transparent conductive thin film by a patterning process, to form a pattern of a first electrode layer 13, wherein the first electrode layer 13 includes multiple first electrodes arranged along a first direction, and the first electrodes are overlapped with the first metal wires 110 through the elongated first openings.

Through the above process, the manufacture of the first substrate of this embodiment is completed, as shown in FIGS. 2 and 3.

The step of manufacturing the second substrate in step (I) includes steps (1) to steps (6):

(1) Depositing a black matrix thin film on a second base 20, and patterning the black matrix thin film by a patterning process, to form a pattern of a black matrix 21 on the second base 20, wherein the black matrix 21 includes multiple first black matrices 211 arranged along the first direction and multiple second black matrices 212 arranged along a second direction, and a width w1 of a first black matrix 211 along the first direction is larger than a width w2 of a second black matrix 212 along the second direction.

(2) Depositing a second metal thin film on the second base 20 on which the aforementioned structures are formed, and patterning the second metal thin film by a patterning process, to form a pattern of a second metal layer 22 on the second base 20, wherein the second metal layer 22 includes multiple second metal wires 220 arranged along the second direction, and at least one first protrusion 221 is provided on the second metal wires 220.

(3) Depositing a second insulating thin film on the second base 20 on which the aforementioned structures are formed, and patterning the second insulating thin film by a patterning process, to form a pattern of a second passivation layer 23 covering the second base 20, wherein the second passivation layer 23 is used for preventing the second metal wires 220 from being corroded by the second electrodes, and the second passivation layer 23 includes at least one second opening 231, each of the at least one second opening 231 exposes a first protrusion 221 on the second metal wires 220 respectively.

(4) Depositing a second transparent conductive thin film on the second base 20 on which the aforementioned structures are formed, and patterning the second transparent conductive thin film by a patterning process, to form a pattern of a second electrode layer 24, wherein the second electrode layer 24 includes multiple second electrodes arranged along the second direction, and the second electrodes are respectively overlapped with the at least one first protrusion 221 on the second metal wires 220 through the at least one second opening 231.

(5) Depositing a third insulating thin film on the second base 20 on which the aforementioned structures are formed, and patterning the third insulating thin film by a patterning process, to form a pattern of a third passivation layer 25 covering the second base 20, wherein the third passivation layer 25 enables a support retaining wall 26 to better be adhered to the second electrodes, and exemplarily, a thickness of the third passivation layer 25 may be 500 angstroms.

(6) Forming the support retaining wall 26 on the second base 20 on which the aforementioned structures are formed.

Through the above process, the manufacture of the second substrate of this embodiment is completed, as shown in FIGS. 4 and 5.

Figure 16:
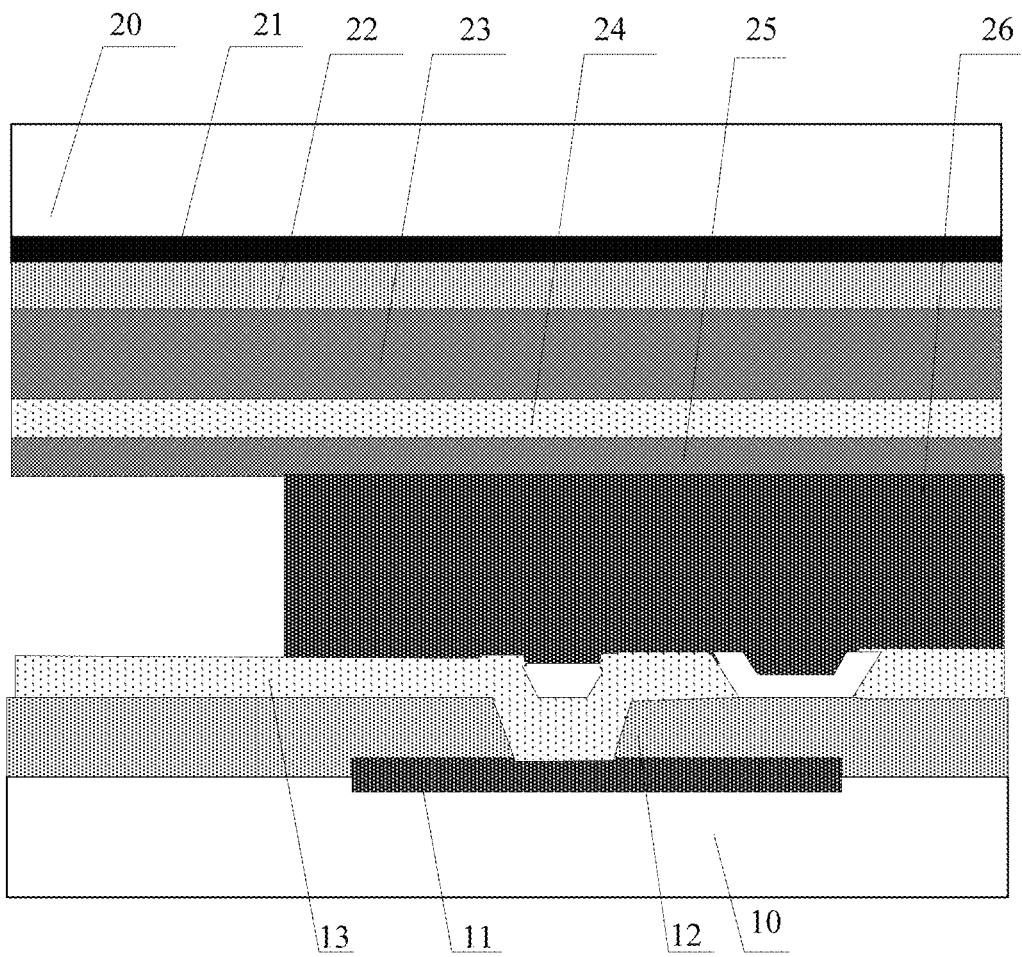
FIG. 16 is a schematic diagram of a sectional structure of a region EE of the second liquid crystal display layer shown in FIG. 6.

After film layers of the first substrate and the second substrate are respectively deposited, the first substrate and the second substrate are aligned, as shown in FIGS. 6 and 16, and then liquid crystal is injected as required.

Supposing that the structure of support retaining wall shown in FIG. 12 is used, that is, the support retaining wall 26 is provided in a curved strip shape, the support retaining wall 26 sequentially fends off all the first electrodes. The frame sealing glue 27 is provided with two openings, one of which is injected with the first bistable cholesteric liquid crystal and the other of which is injected with the second bistable cholesteric liquid crystal.

Supposing that the structure of supporting wall shown in FIG. 13 is used, that is, the supporting wall 26 is provided in a cross shape, the frame sealing glue 27 only needs to have a single opening, and one type of bistable cholesteric liquid crystal is injected into the accommodating space formed by the frame sealing glue 27.

The electrophoretic electronic paper is attached below the second liquid crystal display layer to form the two-layer superimposed electronic paper display screen structure of the embodiment of the present disclosure. As shown in FIG. 14, in the second liquid crystal display layer, the first electrode of the first substrate and the second electrode of the second substrate may accurately control deflection of the liquid crystal by driving the control chip to provide different signals to the first metal wire 110 and the second metal wire 220, respectively, thereby implementing blue-green dual-color display.

In the conventional pixel structure for a passively-driven electronic paper, a drive control signal is directly connected to an ITO electrode through an ITO wire. However, ITO material is indium tin oxide, and its resistance is larger than that of metal, thus, resistance difference between the near-end and far-end pixels in the display region is larger, which easily leads to signal delay and affects display effects.

As can be seen from the structure of the electronic paper display screen and the manufacturing process therefor in the present disclosure, the metal wires are integrally overlapped with the electrodes of the substrate to which the metal wires belong, or the metal wires are overlapped with the connection points on the electrodes of the substrate to which the metal wires belong. Since a block resistance of the metal wires is significantly reduced compared with ITO, the resistance difference between part of electrodes near the position of the control drive circuit and part of electrodes away from the position of the control drive circuit are effectively improved, so that there is almost no difference in resistance between the pixels at the near end and the far end of the display region, the signal delay of the pixels at the far end of the display region is eliminated, the display effect is improved, and the metal wires does not occupy space of a bezel, thereby achieving narrow bezel displaying.

The manufacturing process of the present disclosure may be achieved by using mature manufacturing equipment, and has small improvements in processes, high compatibility, simple process flow, easy periodic maintenance of equipment, high production efficiency, low production cost, high yield, and is convenient for large-scale production, and therefore has a good application prospect.

The structure shown in the present disclosure and the manufacturing process thereof are merely an exemplary description. In an exemplary implementation, the corresponding structures may be altered and the patterning processes may be added or reduced according to actual needs. For example, at least one protrusion may be provided on the first metal wire. As another example, the support retaining wall 26 may have a curved strip shape, or a cross shape, or the like, which is not limited in the present disclosure.

Figure 17:
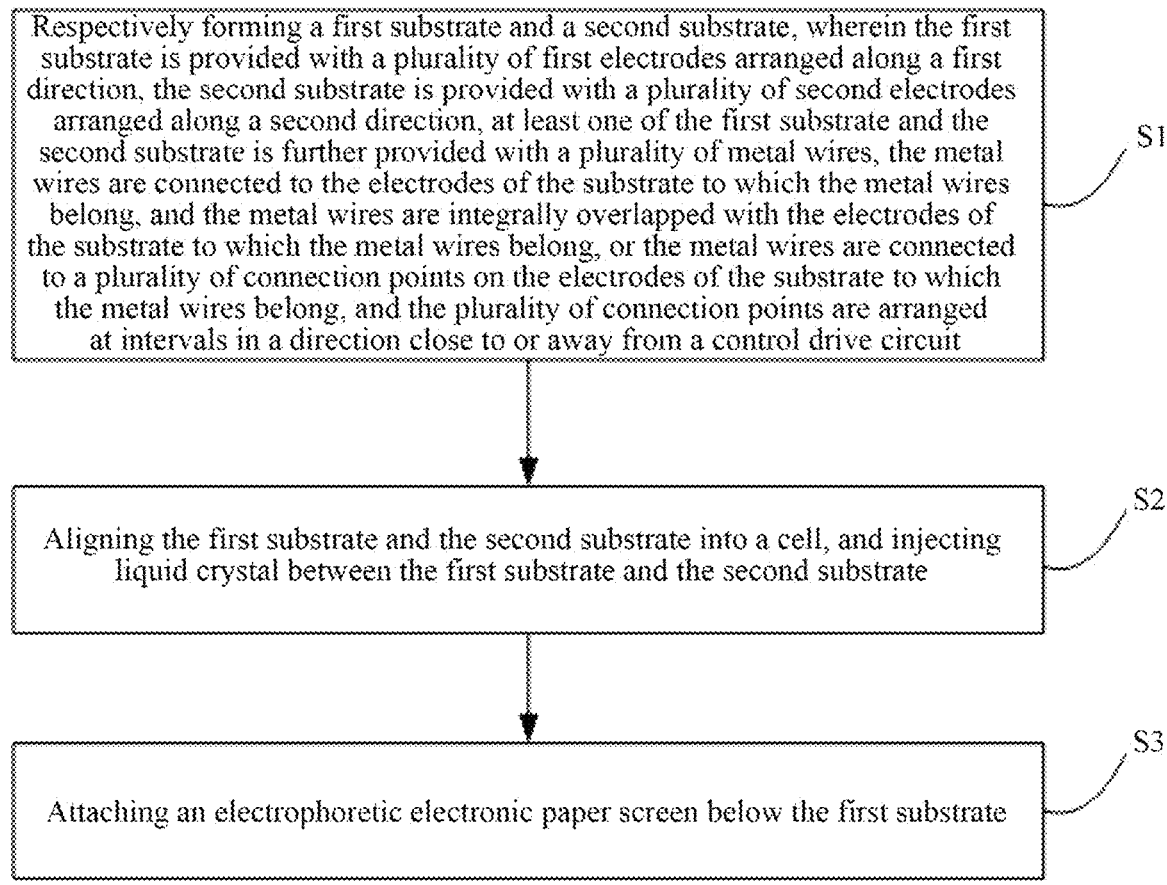
FIG. 17 is a schematic flowchart of a method for manufacturing an electronic paper display screen according to the present disclosure.

The present disclosure further provides a method for manufacturing an electronic paper display substrate, as shown in FIG. 17, the manufacturing method includes steps S1 to S3.

Step S1 includes: respectively forming a first substrate and a second substrate, wherein the first substrate is provided with multiple first electrodes arranged along a first direction, the second substrate is provided with multiple second electrodes arranged along a second direction, at least one of the first substrate and the second substrate is further provided with multiple metal wires, the metal wires are connected to the electrodes of the substrate to which the metal wires belong, and the metal wires are integrally overlapped with the electrodes of the substrate to which the metal wires belong, or the metal wires are connected to at least one connection point on the electrodes of the substrate to which the metal wires belong.

Step S2 includes: aligning the first substrate with the second substrate, and injecting liquid crystal between the first substrate and the second substrate; and Step S3 includes: attaching an electrophoretic electronic paper screen below the first substrate.

In an exemplary embodiment, multiple connection points may be provided, and the multiple connection points are arranged at intervals in a direction close to or away from the control drive circuit.

In an exemplary embodiment, the step of forming the first substrate includes:
- forming a pattern of a first metal layer on a first base, wherein the first metal layer includes multiple first metal wires arranged along the first direction;
- forming a pattern of a first passivation layer on the first metal layer, wherein the first passivation layer includes at least one elongated first opening, the first metal wires are exposed by the at least one elongated first opening; and
- forming a pattern of a first electrode layer on the first passivation layer, wherein the first electrode layer includes multiple first electrodes arranged along the first direction, and the first electrodes are overlapped with the first metal wires through the at least one elongated first opening.

In an exemplary embodiment, the step of forming the first substrate includes:
- forming a pattern of a first metal layer on a first base, wherein the first metal layer includes multiple first metal wires arranged along the first direction, the first metal wires include at least one second protrusion arranged at intervals in a direction close to or away from a control drive circuit;
- forming a pattern of a first passivation layer on the first metal layer, wherein the first passivation layer includes at least one third opening that exposes the at least one second protrusion; and
- forming a pattern of a first electrode layer on the first passivation layer, wherein the first electrode layer includes multiple first electrodes arranged along the first direction, and the first electrodes are overlapped with the at least one second protrusion through the at least one third opening.

In an exemplary embodiment, the step of forming the second substrate includes:
- forming a pattern of a black matrix on a second base, wherein the black matrix includes a first black matrix arranged along the first direction and a second black matrix arranged along the second direction, a width of the first black matrix along the first direction is greater than a width of the second black matrix along the second direction;
- forming a pattern of a second metal layer on the black matrix, wherein the second metal layer includes multiple second metal wires arranged along the second direction, and at least one first protrusion is provided on the second metal wires;
- forming a pattern of a second passivation layer on the second metal layer, wherein the second passivation layer includes at least one second opening that exposes the at least one first protrusion;
- forming a pattern of a second electrode layer on the second passivation layer, wherein the second electrode layer includes multiple second electrodes arranged along the second direction, and the second electrodes are overlapped with the at least one first protrusion through the at least one second opening; and forming patterns of a third passivation layer and a support retaining wall sequentially on the second electrode layer.

The structure of the black matrix in this embodiment is the same as that in the foregoing embodiment, so please refer to the foregoing and it will not be repeated here.

In an exemplary embodiment, the support retaining wall may be in a curved strip shape, one side of the support retaining wall and the frame sealing glue form a first accommodating space, the other side of the support retaining wall and the frame sealing glue form a second accommodating space, and two adjacent first electrodes are respectively located in the first accommodating space and the second accommodating space.

The step of injecting the liquid crystal between the first substrate and the second substrate includes: injecting first bistable cholesteric liquid crystal into the first accommodating space, and injecting second bistable cholesteric liquid crystal into the second accommodating space.

In an exemplary embodiment, multiple support retaining walls may be provided, and the multiple support retaining walls are arranged at intervals, and the support retaining walls have a cross shape.

The step of injecting the liquid crystal between the first substrate and the second substrate includes: injecting bistable cholesteric liquid crystal into an accommodating space formed by the frame sealing glue.

In an exemplary embodiment, the manufacturing method may further include:

respectively forming a third substrate and a fourth substrate, wherein the third substrate is provided with multiple first electrodes arranged along the first direction, the fourth substrate is provided with multiple second electrodes arranged along the second direction, at least one of the third substrate and the fourth substrate is further provided with multiple metal wires, the metal wires are connected to the electrodes of the substrate to which the metal wires belong, and the metal wires are integrally overlapped with electrodes of the substrate to which the metal wires belong, or the metal wires are connected to connection points on electrodes of the substrate to which the metal wires belong;

aligning the third substrate with the fourth substrate, and injecting liquid crystal between the third substrate and the fourth substrate; and bonding the third substrate and the second substrate together.

In this embodiment, the process and principle for forming the third substrate is the same as those for the first substrate, and the process and principle for forming the fourth substrate is the same as those for the second substrate. Please refer to the foregoing and it will not be repeated here.

An embodiment of the present disclosure further provides a display device including the electronic paper display screen of any one of the aforementioned embodiments. The display device may be any product or component with electronic paper display function.

Although the implementations of the present disclosure are disclosed above, the contents are only implementations used for ease of understanding of the present disclosure but not intended to limit the present disclosure. Any one skilled in the art to which the present disclosure pertains can make any modifications and variations in implementation manners and details without departing from the spirit and scope of the present disclosure. However, the protection scope of the present disclosure should be subject to the scope defined by the appended claims.

The invention claimed is:

1. An electronic paper display screen, comprising a first electronic paper screen and a second liquid crystal display layer which are stacked, wherein the first electronic paper screen is an electrophoretic electronic paper screen and the second liquid crystal display layer is a cholesteric liquid crystal display screen, and the second liquid crystal display layer comprises a first substrate, a second substrate and a control drive circuit;

the first substrate and the second substrate are oppositely provided, a plurality of first electrodes arranged in a first direction are provided on a side of the first substrate facing the second substrate, and a plurality of second electrodes arranged in a second direction are provided on aside of the second substrate facing the first substrate;

the first substrate comprises a first base, a first metal layer provided on the first base, a first passivation layer provided on the first metal layer, and a first electrode layer provided on the first passivation layer;

the second substrate comprises a second base, a second metal layer provided on the second base, a second passivation layer provided on the second metal layer, and a second electrode layer provided on the second passivation layer;

the first metal layer comprises a plurality of first metal wires, the second metal layer comprises a plurality of second metal wires, the first electrode layer comprises the first electrodes, the second electrode layer comprises the second electrodes, the first metal wires are connected to the first electrodes through a third opening in the first passivation layer, and the second metal wires are connected to the second electrodes through a second opening in the second passivation layer;

the first passivation layer is provided with at least one elongated first opening, the first metal wires are integrally overlapped with the first electrodes through the at least one first opening, and an orthographic projection of the first metal wires on the first base comprises an orthographic projection of the at least one first opening on the first base;

the second substrate further comprises a black matrix provided between the second base and the second metal layer, and an orthographic projection of the black matrix on the second base comprises an orthographic projection of the first metal wires on the second base and an orthographic projection of the second metal wires on the second substrate:

the black matrix comprises a plurality of first black matrices arranged along the first direction and a plurality of second black matrices arranged along the second direction, and a width of the first black matrix along the first direction is greater than a width of the second black matrix along the second direction;

the first black matrix comprises a first side and a second side oppositely provided along the first direction, a distance between an orthographic projection of the first side on the first base and an orthographic projection of the first metal wire adjacent to the first side on the first base is greater than or equal to a preset first distance, an orthographic projection of the second side on the first base coincides with an orthographic projection of a boundary of the first electrode adjacent to the second side close to the second side on the first base; and the second black matrix comprises a third side and a fourth side oppositely provided along the second direction, an orthographic projection of the third side on the first base coincides with an orthographic projection of a boundary of the second electrode adjacent to the third side close to the third side on the first base, and an orthographic projection of the fourth side on the first base coincides with an orthographic projection of a boundary of the second electrode adjacent to the fourth side close to the fourth side on the first base.

2. The electronic paper display screen according to claim 1, wherein the first passivation layer is provided with at least one of the third opening, a first metal wire is provided with at least one second protrusion, each of the at least one second protrusion is overlapped with a connection point of a first electrode through the at least one of the third opening.

3. The electronic paper display screen according to claim 1, wherein the second passivation layer is provided with at least one of the second opening, a second metal wire is provided with at least one first protrusion, each of the at least one first protrusion is overlapped with a connection point of a second electrode through the at least one of the second opening.

4. The electronic paper display screen according to claim 1, wherein the black matrix comprises first black matrices arranged along the first direction and second black matrices arranged along the second direction, a first black matrix comprises at least one first region and at least one second region, a width of a first region along the first direction is greater than a width of a second black matrix along the second direction, at least one third protrusion is provided in the second region along the first direction, and a width of a third protrusion along the second direction is greater than a width of the second black matrix along the second direction.

5. The electronic paper display screen according to claim 1, further comprising a frame sealing glue, a support retaining wall, first bistable cholesteric liquid crystal and second bistable cholesteric liquid crystal provided between the first substrate and the second substrate, wherein the support retaining wall is in a bend line shape, one side of the support retaining wall and the frame sealing glue form a first accommodating space, the other side of the support retaining wall and the frame sealing glue form a second accommodating space, two adjacent first electrodes are respectively located in the first accommodating space and the second accommodating space, the first accommodating space is filled with the first bistable cholesteric liquid crystal, and the second accommodating space is filled with the second bistable cholesteric liquid crystal.

6. The electronic paper display screen according to claim 1, further comprising a frame sealing glue, a support retaining wall and third bistable cholesteric liquid crystal provided between the first substrate and the second substrate, wherein the frame sealing glue between the first substrate and the second substrate forms a third accommodating space filled with the third bistable cholesteric liquid crystal, and an orthographic projection of the black matrix on the first substrate is overlapped with an orthographic projection of the support retaining wall on the first substrate.

7. The electronic paper display screen according to claim 6, further comprising a third liquid crystal display layer provided on a side of the second liquid crystal display layer away from the first electronic paper screen, wherein the third liquid crystal display layer comprises a third substrate, a fourth substrate, and a frame sealing glue, a support retaining wall and fourth bistable cholesteric liquid crystal provided between the third substrate and the fourth substrate, the frame sealing glue between the third substrate and the fourth substrate forms a fourth accommodating space, and the fourth accommodating space is filled with the fourth bistable cholesteric liquid crystal.

8. The electronic paper display screen according to claim 7, wherein a plurality of support retaining walls are provided between the first substrate and the second substrate and a plurality of support retaining walls are provided between the third substrate and the fourth substrate, the plurality of the support retaining walls are provided at intervals, and a shape of the support retaining walls comprises a cross shape.

9. A display device, comprising the electronic paper display screen according to claim 1.

10. A method for manufacturing an electronic paper display screen, comprising:

forming a first substrate and a second substrate respectively, wherein the first substrate is provided with a plurality of first electrodes arranged along a first direction, the second substrate is provided with a plurality of second electrodes arranged along a second direction, aligning the first substrate with the second substrate, and injecting liquid crystal between the first substrate and the second substrate; and attaching an electrophoretic electronic paper screen below the first substrate, wherein:

the first substrate comprises a first base, a first metal layer provided on the first base, a first passivation layer provided on the first metal layer, and a first electrode layer provided on the first passivation layer;

the second substrate comprises a second base, a second metal layer provided on the second base, a second passivation layer provided on the second metal layer, and a second electrode layer provided on the second passivation layer;

the first metal layer comprises a plurality of first metal wires, the second metal layer comprises a plurality of second metal wires, the first electrode layer comprises the first electrodes, the second electrode layer comprises the second electrodes, the first metal wires are connected to the first electrodes through a third opening in the first passivation layer, and the second metal wires are connected to the second electrodes through a second opening in the second passivation layer; and the first passivation layer is provided with at least one elongated first opening, the first metal wires are integrally overlapped with the first electrodes through the at least one first opening, and an orthographic projection of the first metal wires on the first base comprises an orthographic projection of the at least one first opening on the first base;

the second substrate further comprises a black matrix provided between the second base and the second metal layer, and an orthographic projection of the black matrix on the second base comprises an orthographic projection of the first metal wires on the second base and an orthographic projection of the second metal wires on the second substrate:

the black matrix comprises a plurality of first black matrices arranged along the first direction and a plurality of second black matrices arranged along the second direction, and a width of the first black matrix along the first direction is greater than a width of the second black matrix along the second direction;

the first black matrix comprises a first side and a second side oppositely provided along the first direction, a distance between an orthographic projection of the first side on the first base and an orthographic projection of the first metal wire adjacent to the first side on the first base is greater than or equal to a preset first distance, an orthographic projection of the second side on the first base coincides with an orthographic projection of a boundary of the first electrode adjacent to the second side close to the second side on the first base; and the second black matrix comprises a third side and a fourth side oppositely provided along the second direction, an orthographic projection of the third side on the first base coincides with an orthographic projection of a boundary of the second electrode adjacent to the third side close to the third side on the first base, and an orthographic projection of the fourth side on the first base coincides with an orthographic projection of a boundary of the second electrode adjacent to the fourth side close to the fourth side on the first base.

\* \* \* \* \*